Jan. 3, 1961 V. G. VAUGHAN 2,967,269
THERMAL PROTECTORS FOR ELECTRICAL TRANSLATING DEVICES
Filed April 28, 1958 2 Sheets-Sheet 2
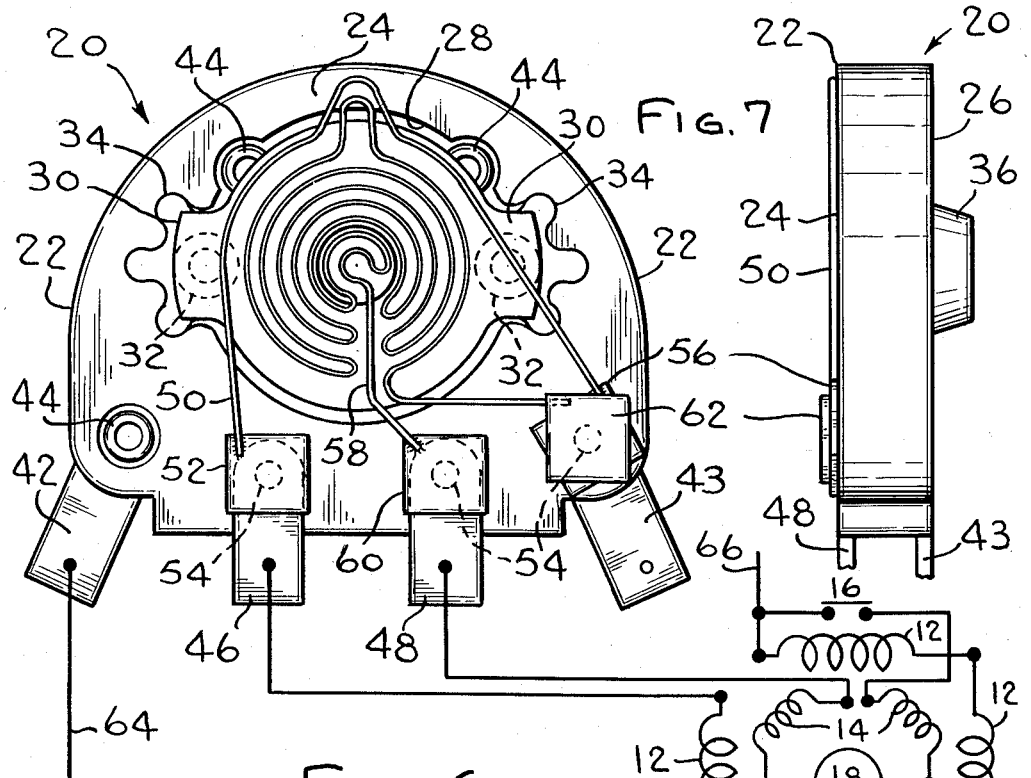
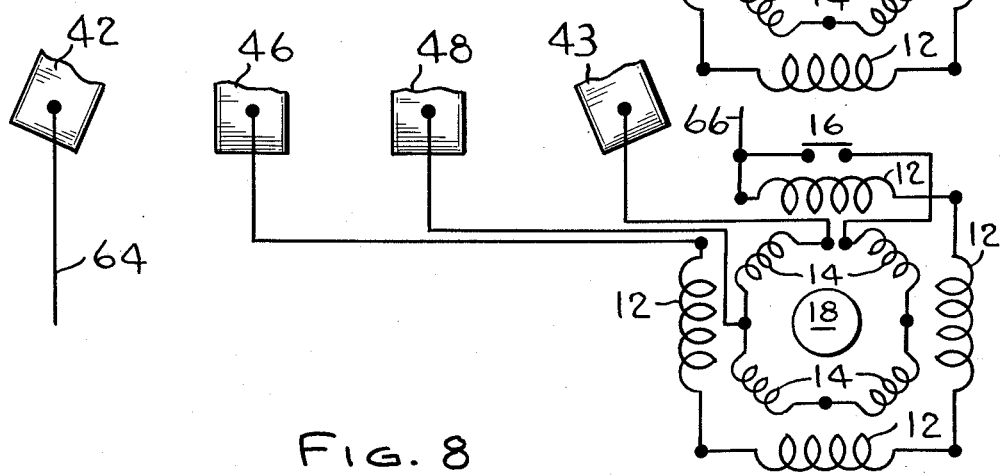
INVENTOR.
VICTOR G. VAUGHAN
BY
John W. Michael
ATTORNEY United States Patent Office 2,967,269
Patented Jan. 3, 1961

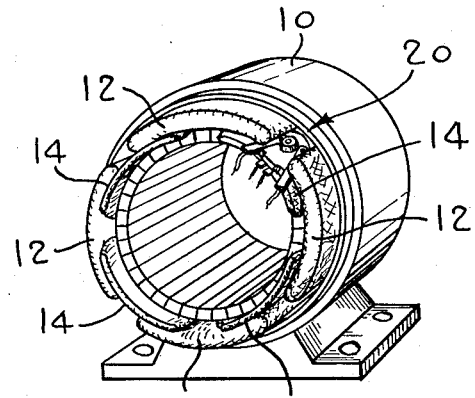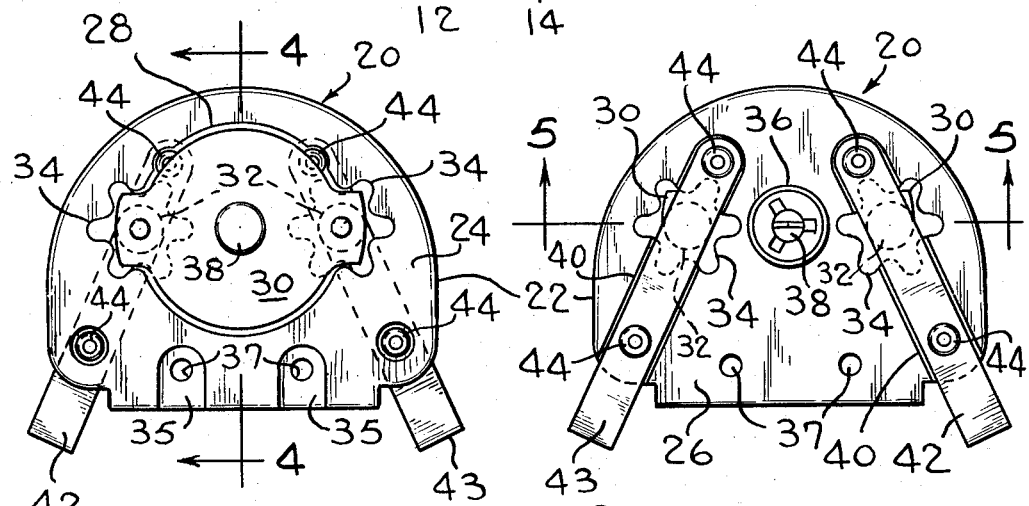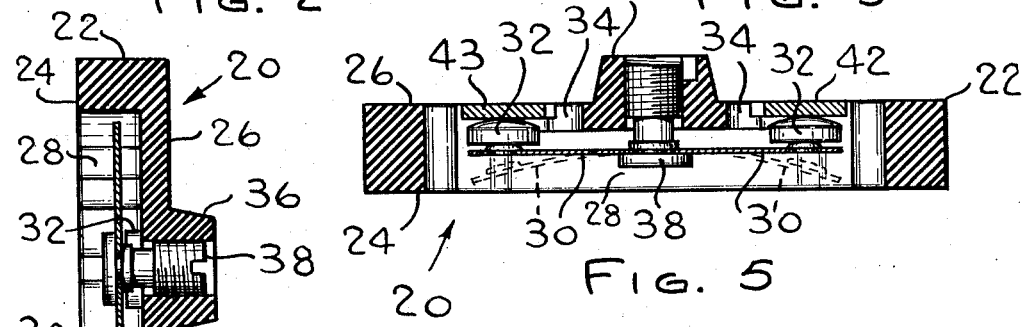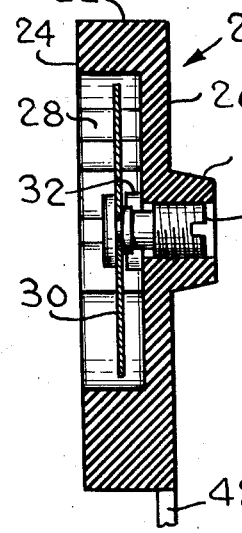

2,967,269

THERMAL PROTECTORS FOR ELECTRICAL TRANSLATING DEVICES

Victor G. Vaughan, 5702 Ocean Drive, Corpus Christi, Tex.

Filed Apr. 28, 1958, Ser. No. 731,470

7 Claims. (Cl. 318—221)

This invention relates to improvements in thermal protectors for electrical translating devices, particularly protectors adapted to be mounted directly on the windings of such devices, and to systems for the thermal protection of two winding single-phase alternating current motors.

One object of this invention is to provide a motor protector of minimum thickness which can be located at points that will give the best thermal protection to the motor while requiring a minimum of heating effect from the current flowing through the protector or heaters associated with it.

Another object of this invention is to provide such a motor protector including a thermal assembly to which one or more heaters can be readily added after the thermal assembly has been calibrated.

A still further object of this invention is to provide a system, including such a protector to give to a two winding single-phase electric motor complete protection against overloads up to and including locked rotor, regardless of ambient temperature and/or voltage variations or open circuit in either main or starter winding.

In accomplishing the first object the frame for the protector has a thickness limited to the overall thickness of the terminal-stationary contacts, the contact buttons carried on the thermal element, and the thermal element, plus the distance traveled by the thermal element to open position. This overall thickness is increased at the center only by a projecting hub for mounting the thermal element adjusting means. Such a frame will fit between one of the starter windings and the overlying adjacent pole (running) windings with the hub positioned between such pole windings. In such position it will be in good thermal contact with the windings and subject to the heat of the windings with a minimum of loss hence the I²R heat from the current flowing through the thermal element, and any heaters associated with it, is kept to the lowest possible amount with consequent savings, greater range of ratings, flexibility and accurateness. However, there are many types of motors in which the protector needs only contact one winding.

In accomplishing the second object, preformed heaters are mounted on the open face of the frame, being attached to the terminals or terminal holding rivets. This face forms the base and reference plane which maintains the radiating face of the heater at a prescribed uniform distance from the thermal element. This open face construction also permits the use of larger current-carrying heaters operating at lesser temperatures and thus resulting in improved uniformity and performance characteristics. By mounting the heaters on the open face of the frame, heaters of many shapes, sizes and resistances can be added even after the thermal elements have been job calibrated.

In accomplishing the third object, the thin wafer-type protector including its thermal element is provided with (1) a low resistance running winding heater connected in series with the running winding of a single-phase motor and (2) a longer resistance heater connected in series with the starter winding and starter winding cut-out switch. Preferably the starter winding heater is placed opposite the thermal element so that the radiant heat is efficiently transferred to such element. The protector may be sandwiched between adjacent running windings and the starter winding which they overlie in good thermal contact with one or both windings and where it is subject to the heat thereof. When the protector is connected as described, the resulting system will protect all the windings of the motor against (1) running overloads, (2) locked rotor at normal line voltage, (3) locked rotor at low line voltage, (4) locked rotor with open circuit in the running winding, (5) locked rotor with open circuit in the starter winding, and (6) running with both windings energized, thus giving complete protection.

In the accompanying drawings:

Fig. 1 is a view in perspective of the frame and stator windings of a single-phase motor or electrical translating device and a protector embodying the present invention;

Fig. 2 is a bottom plan view of a wafer-type protector embodying one aspect of the present invention;

Fig. 3 is a top plan view of the protector of Fig. 2;

Fig. 4 is an enlarged sectional view taken on the line 4—4 of Fig. 2;

Fig. 5 is an enlarged sectional view taken on the line 5—5 of Fig. 3;

Fig. 6 is a slightly enlarged bottom plan view of a protector including a running winding heater and a starter winding heater in a system including a single-phase motor, the circuits of such system being shown schematically;

Fig. 7 is a fragmentary right hand view of the protector and heaters only of Fig. 6; and Fig. 8 is a fragmentary schematic view of a modified system of the protector and single-phase motor employing the starter winding heater as a voltage heater.

Referring to the accompanying drawings there is shown a single-phase motor or electrical translating device having a frame 10 in which are mounted stator windings including running (pole) windings 12 and starter windings 14, a starter winding switch 16 of conventional design, a rotor 18, and a motor protector 20. The elements of the modern conventional single-phase motor are shown schematically except that in the perspective view of Fig. 1 the frame 10, stator windings 12 and 14 and protector 20 are illustrated to show their physical relationship and the manner in which the wafer-type protector is placed in close thermal contact with the windings. However, it is to be understood that the thermal protector and thermal protective system embodying this invention may be used with other electrical translating devices.

The wafer-type inherent overheat protector 20 has a body 22 of insulating material having a bottom or open face 24 and a top or closed face 26. Such body has a substantially circular recess 28 which accommodates a disc-like snap acting thermal element 30 to which are welded or otherwise secured contact buttons 32 all of well-known design. Extending from the open face 24 and the bottom of recess 28 to the top or closed face 26 are circumferentially indented openings 34. The walls of these openings provide guides and limiting abutments for the thermal element 30 preventing it from turning during adjustment. These openings also provide space for arc-over expansion and thereby lessen injury to the insulating material. The open face 24 has recesses 35 and eyelet holes 37 for securing additional terminals when heaters are employed. A centrally located projecting hub 36 provides support for the adjusting screw 38 which adjustably holds the thermal element 30 within the recess. The top or closed face 26 is provided with elongated recesses 40 in which are seated terminals 42 and 43 which also are the stationary contacts engaged directly by the contact buttons 32. The upper faces of the terminals are flush with the closed face 26. These terminals are held in place by eyelets 44 the heads of which are countersunk in the open face 24 so as to be flush therewith.

This wafer-type protector, except for the hub 36, has a thickness which is no greater than the combined thickness of the terminals 42, contact buttons 32, and thermal element 30 plus the distance (inherently established) which the thermal element travels from closed to open position. The wafer may have a substantially semi-circular plan shape as shown. This shape together with the minimum thickness permits the protector 20 to be placed between the extended end of a starter winding 14 and the overlapping extended ends of adjacent running windings 12 as shown in Fig. 1 to establish good thermal contact with all such windings. The hub 36 will fit in the space between the adjacent running windings.

In some applications the protector is used without heaters and is subject to the I²R heating effect within the thermal element 30 and the radiant and conducted heat from the windings. At least in such instances it is also advantageous to make the bottom or open face 24 arcuate to conform with the arcuate surface of the starter winding 14 or any winding on which it is mounted thus automatically strengthening the body 22 particularly at the terminal fastening points.

An advantage of this wafer-type protector 20 is the ease with which heaters of various sizes and shapes can be mounted to the flat open face 24. This face is a reference plane which is always a uniform distance from the face of the thermal element 30 (when closed) and the heater or heaters flushly abut such face to accurately and uniformly set the distance between the radiant surface of the heater and face of the thermal element. The heaters may be added to the protector after the thermal element has been calibrated. They may be added by various methods such as having each heater provided with flat mounting pads which are secured to the protector terminals by rivets passing through the terminal holding eyelets, such as is shown in Figs. 6 and 7. However, the heaters may be directly welded to the protector terminals 42 or other heater terminals additionally mounted on the protector. Heaters may be made of wire, ribbon or blanked out sheet and various sizes, shapes and resistances may be stocked so that various combinations of thermal elements and heaters can be made to provide a wide range of ratings suitable to the varied characteristics of electrical translating devices.

Another advantage of this wafer-type protector is that the area available for the heaters is greater than in equally rated prior protectors. Hence the heaters can be of larger current-carrying capacity and will be effective without reaching excessive temperatures. This results in improved uniformity and performance characteristics.

While not shown, it will be understood to those skilled in this art that when it is desirable to have the effect of mass (for example to sustain an open position) a mica shield may be inserted between the heater and the thermal element. In lieu of this one heater could be placed on the top or closed face 26 of the protector. The heater could also be wrapped around the body 22.

It is within the contemplation of this invention that the protector 20 with or without heaters mounted thereon may be encased in insulating tape sealed with thermosetting adhesive or other cement to electrically insulate the unit and seal it against dust and other foreign matter. Such insulating tape may also be used to keep the heater in thermal contact with the winding or other part of the electrical translating device. In these modifications the leads may be assembled to the terminals before encasing. The encased and sealed unit may be added to the windings before impregnation.

One example of a set of heaters mounted on the protector 20 is shown in Figs. 6 and 7. In this modification the protector 20 has added to its face 24 additional terminals 46 and 48 held in the recesses 35 by eyelets (not shown) to which the heaters are attached. A relatively short low resistance running winding heater 50 has on its left hand end a mounting pad 52 provided with a rivet 54 extending only from one side thereof and on its other end an apertured mounting pad 56. A starter winding heater 58 shaped as shown and about 8 to 10 times longer than the heater 50 has on its ends mounting pads 60 and 62 each provided with rivets 54 projecting only from one side. The wire of the heaters is mounted to the pads and welded in place so that when the pads are positioned as shown such wire where it overlies the face 24 will lie flush against such face. The rivets 54 extend through the eyelets holding the terminals 46 and 48 and are peened over flush with the closed face 26. The heater 58 is desirably located directly opposite the central part of the thermal element 30 whereby the radiant heat from such heater will be most effective within the short time allowed, say 4 to 6 seconds in the most severe applications of starting current. The heater 50 may be placed as shown where the I²R heat developed therein during normal running conditions will be transmitted by conduction (some times partly by radiation) to the thermal element 30. From the foregoing description it can be seen that heaters of varying sizes and shapes can be prefabricated and after selection of the desired ones readily and accurately mounted to the protector 20.

Such a protector including such heaters is part of a system for the complete protection of a two winding single-phase motor. As seen from the schematic circuit of Fig. 6 the protector terminal 42 is connected to one side 64 of a power supply circuit. The right hand end of heaters 50 and 58 are joined and connected to the terminal contact 43. The left hand end of heater 50, through terminal 46, is connected to the left hand end of the running windings 12. The left hand end of heater 58, through terminal 48, is connected to the left hand end of the starter windings 14. The right hand end of starter winding 14 is connected to the starter switch 16. This switch and the right hand end of running winding 12 are both connected to another side 66 of the power supply circuit. Thus when the motor is first thrown on the line by a control (not shown), both heaters will be in series with the respective windings and I²R heat will develop in them. As is customary with this type of single-phase motor, the starter switch 16 will open when the rotor 18 attains the predetermined proper operative speed. When this occurs the starter winding 14 and heater 58 are removed from the circuit and deenergized. If in this running condition an overload occurs, the thermal element 30, main or running winding 12, and the heater 50 all carry in series the resultant larger load current with an increase in the effective I²R heat. The result will be an opening of the circuit before damage to the winding 12. If the starter switch 16 should freeze and fail to open the heater 58 and starter winding 14 would remain in circuit and the voltage of the system is still applied to them and practically the same current will flow through them as might occur if the rotor were locked. Hence the I²R heat developed will open the protector and keep both windings from being damaged. If the rotor is locked both heaters and their respective windings are across the line in parallel and whether there be normal or low line voltage the starter winding heater will supply the required I²R effective heat to cause opening of the protector to protect both windings. If in this locked condition there is an open circuit in the running winding circuit, the starter winding will still receive protection from the series heater 58. In this same locked condition, if the open circuit is in the starter winding, the heater 50 will still protect the running winding 12 the same as in overload condition while the rotor is operating.

In the system shown in Fig. 8, the starter heater 58 is connected as a voltage heater rather than a series heater. In this circuit the starter winding is in series only with the thermal element 30 by reason of connecting terminal 43 directly to the left hand end of starter winding 14. By connecting terminal 48 to selected spots between the poles of the starter winding 14, the effective $I^2R$ heat in the heater 58 may be readily varied to meet operating characteristics. It will be understood to those skilled in this art that there may be some changes needed in the diameter, length and material of the starter heater 58 when it is connected as a voltage heater in the manner shown in Fig. 8. However, there is no difference in the principal functions and ultimate complete protection is afforded. The choice depends upon balancing higher costs with more flexibility against lower cost with less flexibility.

One feature resulting from the ability to mount the wafer-type protector in good thermal contact with the windings is that less wattage is then needed in the running winding heater. In practice this means that only a relatively few different sizes of standardized prefabricated thermal elements and voltage type starter heaters are required. These can be combined with a series heater for the main winding made of copper or other low resistance conducting material easily prepared on the job from available materials to meet a large variety of motor characteristics.

I claim:

1. A motor protector having a body of insulating material provided with a closed face and an open face, said closed face having terminal receiving recesses in the outer surface thereof extending to an edge of such face, said body having a thermal element recess extending inwardly from said open face to a bottom, said closed face having openings extending from said terminal receiving recesses to the bottom of said thermal element recess, terminals seated in said terminal receiving recesses and extending laterally of said closed face substantially in the plane of the outer surface thereof, stationary contacts connected with said terminals contactable from within said thermal recess by reason of said openings, a snap acting current carrying thermal element mounted within said thermal element recess and having a contact carrying side facing the bottom of said thermal element recess, and contacts on said contact carrying side engageable with said stationary contacts to make a circuit between said terminals, said thermal element having an outer face facing toward said open face, said outer face in the closed position of said thermal element being accurately spaced from said open face whereby said open face provides a reference plane for the accurate positioning of heaters with respect to said thermal element, said open face having a substantial area extending beyond the periphery of said thermal element receiving recess to provide an area for heaters greater than in equally rated prior protectors, said protector having a minimum thickness from closed face to open face to adapt said protector for insertion between windings or between winding and the frame of modern electric motors with the protector in direct contact with the winding.

2. A motor protector as defined in claim 1 including a heater mounted on said open face with its inner face spaced from the outer face of said thermal element by reference to said open face and having a part over said thermal element recess and opposite said thermal element whereby radiant heat therefrom is directed onto said thermal element.

3. A motor protector as defined in claim 1 including at least two heater elements on said open face and accurately spaced from the outer face of said thermal element by reference to said open face, one of said heater elements being spaced to one side of said thermal element recess.

4. A system for an electrical translating device having at least two windings, comprising a protector for said windings including a circuit carrying thermal element for opening the circuit to said windings, a heater in series with each of said windings and said thermal element, said heaters being carried by said protector in heat transfer relationship to said thermal element, said protector being in contact with at least one of said windings to form a good heat transfer to said protector, and a source of power connected to said thermal element and said windings.

5. In combination: an electrical energy translating device having, a rotor, a running winding, a starter winding, and a starter winding switch connected to said starter winding to open the circuit to said starter winding during normal operating speeds of said rotor; a protector for protecting (1) said main winding while the rotor is running at normal line voltage, (2) both said windings while the rotor is locked at normal voltage, (3) both said windings while the rotor is stalled at lower than normal line voltage (4) both said windings while the rotor is running at normal line voltage, (5) only said main winding when said rotor is stalled at normal line voltage, and (6) only said starter winding when said rotor is stalled at normal line voltage, said protector having a body with closed face, an open face, and a recess opening to said open face, a thermal snap acting switch element in said recess to connect and disconnect said windings to a power supply circuit, said open face and said switch element in the closed position of said element being accurately spaced so that said open face constitutes a reference plane for positioning heater elements relative to said switch element, heater elements carried by said protector and spaced from the outer face of said switch element by said reference plane, one of said heater elements being electrically connected between said switch element and said running winding, and another of said heater elements being electrically connected between said switch element and said starter winding; and means mounting said protector in good thermal contact with both said windings so that said heater elements and said thermal snap acting switch element and said protector receive the heat thereof and said protector is less influenced by varying ambient temperatures and the heater element connected with said running winding element can be of less wattage to permit said heater to be made from low resistance readily available material.

6. The combination set forth in claim 5 in which said heater connected with said running winding is a relatively short low resistance larger current carrying heater element operating at lesser temperatures to provide improved uniformity and performance characteristics.

7. The combination set forth in claim 5 in which said another heater element is connected in parallel with at least some part of said starter winding whereby said heater element has the operating characteristic of a voltage heater.

References Cited in the file of this patent

UNITED STATES PATENTS

| | | |
|---|---|---|
| 1,947,078 | Cobb | Feb. 13, 1934 |
| 2,063,981 | Brunner | Dec. 15, 1936 |
| 2,414,531 | Johns | Jan. 21, 1947 |
| 2,768,342 | Vaughan et al. | Oct. 23, 1956 |